(12) United States Patent
Beerhold

(10) Patent No.: US 6,271,789 B1
(45) Date of Patent: Aug. 7, 2001

(54) METHOD FOR CHECKING THE RELIABILITY OF NOMINAL POSITION INDICATIONS

(75) Inventor: Jens Rainer Beerhold, Dormagen (DE)

(73) Assignee: Litef GmbH (DE)

( * ) Notice: Subject to any disclaimer, the term of this patent is extended or adjusted under 35 U.S.C. 154(b) by 0 days.

(21) Appl. No.: 09/402,851
(22) PCT Filed: Apr. 9, 1998
(86) PCT No.: PCT/EP98/02106
  § 371 Date: Jan. 5, 2000
  § 102(e) Date: Jan. 5, 2000
(87) PCT Pub. No.: WO98/45723
  PCT Pub. Date: Oct. 15, 1998

(30) Foreign Application Priority Data

Apr. 10, 1997 (DE) .............................................. 197 14 985

(51) Int. Cl.[7] ...................................................... H04B 7/185
(52) U.S. Cl. ...................... 342/357.14; 701/220; 701/221
(58) Field of Search ....................... 342/357.14; 701/220, 701/221

(56) References Cited

U.S. PATENT DOCUMENTS 5,075,693 * 12/1991 McMillan et al. ................... 342/457
5,646,857 * 7/1997 McBurney et al. .
5,825,326 * 10/1998 Semler ................................. 342/352

* cited by examiner

Primary Examiner—Theodore M. Blum
(74) Attorney, Agent, or Firm—Elliot N. Kramsky

(57) ABSTRACT

A method for checking the reliability of nominal position findings on the basis of propagation time measurements. The method is characterized by the use of inertial systems to increase the measurement redundancy of the available measured values. The dimension of the measurement matrix of the nominal system is advantageously increased for such purpose. The method is primarily suitable for hybrid inertial/satellite navigation systems.

11 Claims, 1 Drawing Sheet

METHOD FOR CHECKING THE RELIABILITY OF NOMINAL POSITION INDICATIONS

BACKGROUND

1. Field of the Invention

The present invention relates to methods for integrating satellite and inertial navigation systems. More particularly, this invention pertains to a method for checking the reliability of nominal position findings.

2. Description of the Prior Art

Position and velocity with respect to a given coordinate system are the essential outputs of a navigation system. Inertial navigation systems supply these variables at a high update rate and can be jammed only with difficulty as they require solely internal sensors and no external system components. Their disadvantage resides in the degradation of their accuracies over time. In contrast, nominal (e.g. satellite) navigation systems achieve excellent long-term accuracy, yet possess only a limited update rate while being highly susceptible to jamming as they are based upon the principle of measuring the propagation time of an electromagnetic wave between a satellite and a receiver.

The disadvantages of each of the above systems can be eliminated by their integration or combination. Error variables are determined from the output variables of the two systems and converted by an optimizing filter (generally a Kalman filter) into so-called support variables. The support variables are employed for continual correction of the inertial system.

As satellite navigation systems are highly susceptible to jamming, it is essential for safety-critical applications to employ a means for error identification that checks the output variables of the satellite navigation system for consistency and decides whether they may be used for support.

To use satellite navigation for position finding and determining velocity, it is necessary to measure and evaluate at least four satellite signals. Should an erroneous measurement be identified, the number of required measured values is increased to at least five. In practice, however, six or more measurements are often employed. The measured values are processed in a mathematically appropriate manner and are then subjected to a hypothesis test. A statistical statement can be derived from the test as to whether one or more measurements is erroneous.

The statistical characteristics of the hypothesis test improve, as a step function, with the number of available measured values. Due to the mathematical character of the use of satellite navigation for position findings, findings determined in other ways can be included in the hypothesis test to increase its statistical reliability.

Statistical methods are employed for error identification in satellite navigation and can be split into two classes:

1. Methods based upon individual measurements; and
2. Methods based upon series of measurements.

All methods based upon individual measurements are subject to an assumption that statistically independent, noisy, possible erroneous measurements exist at the respective measurement time. The basic measurement equation, which produces the relationship between (n>4) available measurements and the receiver position and velocity, is described by the following linear, overdefined equation system:

$$V = G \cdot X_{act} + \epsilon$$

where y, a vector of dimension n×1, contains the difference between the measured range (pseudo-range) and that estimated on the basis of the nominal state vector; $X_{act}$ describes the error between the nominal value and the four-dimensional state vector (position and/or velocity, and time-base offset) calculated from the current measurement; G represents the linearized n×4 measurement matrix; and $\epsilon$, a vector of dimension n×1, describes the measurement noise, including any measurement errors.

The least squares method is employed, infra, to illustrate the group of methods based on individual measurements. All other methods of this kind can be related back to it or to work on similar mathematical procedures.

A solution for x is first calculated in accordance with the least squares method.

$$X_{LS} = (G^T G)^{-1} G^T y$$

This is employed for determining the expected value for the measurement factor y.

$$\hat{y} = G \cdot X_{LS}$$

The expected value is subtracted from the actual measurement vector, y, to produce a residue vector w.

$$w := y - \hat{y} = (1 - G(G^T G)^{-1} G^T) \epsilon$$

The residue vector w is multiplied by its transposed vector to form a scalar test variable T:

$$T := W^T W$$

It is known that measurement errors $\epsilon_i$ of Gaussian distribution produce a test variable T having a Chi-square distribution with n−4 degrees of freedom. The test variable T can thus be subjected to a Chi-squared hypothesis test and a statistical statement can be made about the expected state vector inaccuracy. Should the numerical value of the inaccuracy exceed a predetermined limit S, it is then assumed that the measurement is erroneous.

It is known to include the barometric altitude P in the measurement equation in avionics applications. For this, the measurement matrix G, containing the direction cosine between the receiver and the n satellites, is expanded by one line:

$$\underline{G}' = \begin{bmatrix} c_{11} & c_{12} & c_{13} & 1 \\ c_{21} & c_{22} & c_{23} & 1 \\ \vdots & \vdots & \vdots & \vdots \\ c_{n1} & c_{n2} & c_{n3} & 1 \\ 0 & 0 & \sigma_{sat}/\sigma_b & 0 \end{bmatrix}$$

where $\sigma_{sat}/\sigma_b$ is the ratio of the noise in the pseudo-range measurements to that from the barometric altimeter.

The residue vector dimension is likewise increased:

$$W' = (y1 - \hat{y}1, y2 - \hat{y}2, \ldots, Yn - \hat{y}n, (yZ_b - \hat{y}Z) \div (\sigma_b/\sigma_{sat}))^T,$$

where $YZ_b$ is the difference between the barometric altitude and the nominal altitude and $\hat{y}z$ is the altitude error calculated using least squares.

The above measure increases the degrees of freedom of the Chi-square distribution of T. This results in improvement of the statistical characteristics of the hypothesis test for the same number of received satellites. An additional important advantage is that test feasibility is insured, even for the case of n=4 usable satellites, since the dimension of the new measurement matrix G' is equal to n+1.

Error identification methods based on series of measurements are based on an algorithm published as early as 1965 under the name "Adaptive Kalman Filtering" or "Multiple Model Estimation Algorithm (MMEA)".

The MMEA employs a bank of Kalman filters in parallel. Each Kalman filter models all the relevant parameters of the system to be monitored as well as an additional parameter describing a hypothetical error. In the current field of application, a Kalman filter is employed for each received satellite, with the assumption made that the pseudo-range measurement is corrupted by a possible error that is a linear function of time. After a sufficiently long observation time, a statistical statement can be made as to whether one of the observed satellites is, in fact, erroneous.

U.S. Pat. No. 5,583,774 discloses a method for checking the reliability of nominal position findings on the basis of propagation time measurements. As taught by that patent, the measurement redundancy of the measured values available for error identification is increased by inertial systems. An algorithm is employed that depends on an observation time, preferably of 30 minutes.

The disadvantages of these methods are primarily the observation time required (measurement time period $\geq 30$ minutes) and the high degree of complexity required for implementation.

SUMMARY AND OBJECTS OF THE INVENTION

It is therefore an object of the present invention to provide a method for checking the reliability of nominal position findings so that the output variables, used to support an inertial system, of a nominal system may be easily, quickly and cost-effectively checked for consistency.

The present invention addresses the preceding and other objects by providing an improvement in a method for checking the reliability of nominal position findings on the basis of propagation time measurements in which inertial systems are used to increase the measurement redundancy of measured values available for error identification. Such improvement resides in employing the inertial systems to increase the dimension of a measurement matrix of a nominal system on the basis of propagation time measurements.

The preceding and other features and advantages of the invention shall become further apparent from the detailed description that follows. Such description is accompanied by a set of drawing figures. Numerals of the drawing figures refer to those of the written description with like numerals referring to like features throughout.

DETAILED DESCRIPTION OF THE PREFERRED EMBODIMENT

Figure 1:
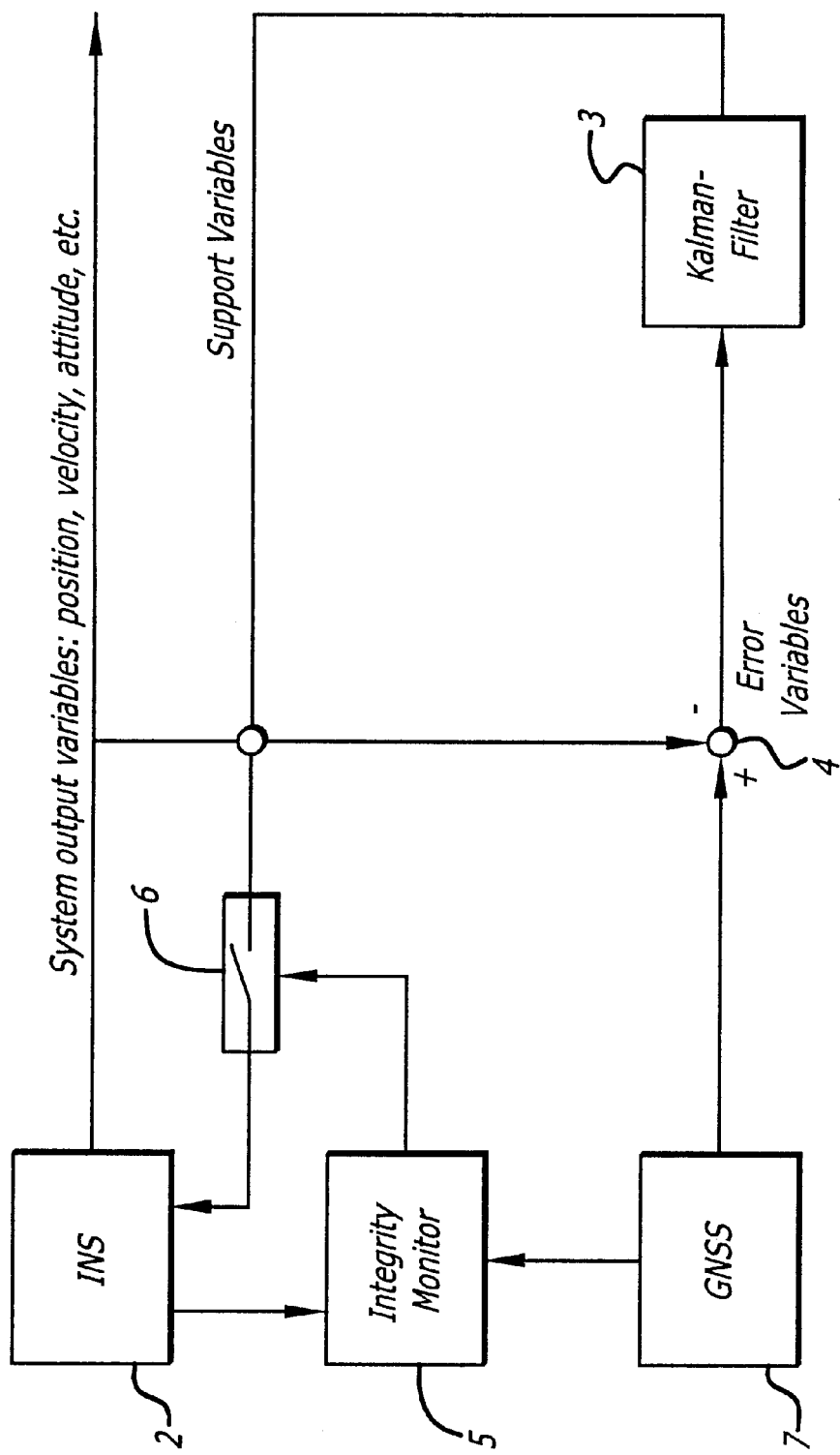
FIG. 1 is a block diagram of a hybrid inertial/satellite navigation system for practicing the method of the invention.

Turning to FIG. 1, a hybrid inertial/satellite navigation system includes a GNSS (Global Navigation Satellite System) 1 employed to support an INS (Inertial Navigation System) 2. Such support is effected by means of a Kalman filter 3. The filter 3 utilizes the difference between the system output values of the GNSS 1 and those of the INS 2 calculated by an adder 4 to calculate the support variables required for supporting the INS 2, and to supply such support variables to the INS 2.

An integrity monitor 5 is provided that, in accordance with the invention, receives at least the position and velocity system output values from both the GNSS 1 and the INS 2. Based on the method of the invention as described infra, the integrity monitor 5 actuates a switch 6 which, in the event of an error, interrupts the support to the INS 2.

The increase in measurement redundancy of the available measured values according to the invention is illustrated, for example, by means of the position solution in the INS 2 for the vertical component (in this case $Z_{in}$) and a horizontal component (in this case $X_{in}$) In this case, the measurement matrix becomes:

$$\underline{G}'' = \begin{bmatrix} c_{11} & c_{12} & c_{13} & 1 \\ c_{21} & c_{22} & c_{23} & 1 \\ \vdots & \vdots & \vdots & \vdots \\ c_{n1} & c_{n2} & c_{n3} & 1 \\ \sigma_{sat}/\sigma_{xin} & 0 & 0 & 0 \\ 0 & 0 & \sigma_{sat}/\sigma_{zin} & 0 \end{bmatrix}$$

This results in the following residue vector:

$W''=(y1-\hat{y}1, Y2-\hat{y}2, \ldots, yn-\hat{y}n, (yx_{in}-\hat{y}x) \div (\sigma X_{in}/\sigma_{sat}), (yz_{in}-\hat{y}z)/(\sigma z_{in}/\sigma_{sat}))^T$ In this case, $\sigma_{sat}/\sigma X_{in}$ is the ratio of the noise in the pseudo-range measurements to the noise in the horizontal x-component in the inertial system; $\sigma_{sat}/\sigma Z_{in}$ is the ratio of the noise in the pseudo-range measurements to the noise in the vertical component of the inertial system; $yX_{in}$ and $yZ_{in}$ indicate the difference between the inertial and nominal x- and z-components, respectively; and $\hat{y}x$ and $\hat{y}z$ indicate the errors calculated by the least squares method.

The method according to the invention also allows the inclusion of other inertial components or scaling using system parameters other than the measurement noise.

Thus it is seen that, according to the invention, inertial systems are employed to increase the measurement redundancy of the measured values available for error identification, in that the dimension of the measurement matrix G of the nominal system is increased on the basis of these propagation time measurements, by including one or more inertial components.

By including the inertial components, the method according to the invention offers, in particular, the advantage of comparison of the satellite navigation solution to the inertial navigation solution, the increase in the dimension of the measurement matrix producing a major improvement in availability as well as a significant improvement in the statistical characteristics of the instance for error identification. Since the inertial components can only vary continuously, step-function errors in the satellite navigation system (caused, for example, by shadowing or reflection) can be detected immediately. Gradual errors, above a threshold value which can be defined, can furtheron be detected.

As the method of the invention is based upon individual measurements, implementation complexity is low.

While this invention has been described with reference to its presently-preferred embodiment, it is not limited thereto. Rather, the invention is limited only insofar as it is defined by the following set of patent claims and includes within its scope all equivalents thereof.

What is claimed is:

1. In a method for checking the reliability of nominal position findings on the basis of propagation time measurements in which inertial systems are employed to increase measurement redundancy of measured values available for error identification, the improvement comprising the step of employing said inertial systems to increase dimension of a measurement matrix of a nominal system based on the propagation time measurements.

2. A method as defined in claim 1, further including the step of utilizing an inertial vertical component to increase the measurement redundancy of the measurement matrix of the nominal system.

3. A method as defined in claim 1 including the step of using at least one inertial horizontal component to increase the measurement redundancy of the measurement matrix of the nominal system.

4. A method as defined in claim 1 including the step of introducing the ratio of noise in nominal pseudo-range measurements to the noise in an inertial component into the measurement matrix of the nominal system.

5. A method as defined in claim 1 including the step of expanding a linearized n×4 measurement matrix of the nominal system by one line, in which one element contains a value which represents an inertial measurement, to increase dimension.

6. A method as defined in claim 5 wherein the linearized n×4 measurement matrix of the nominal system has at least one line comprising the elements $\sigma_{sat}/\sigma x_{in}$, 0, 0, 0 added, $\sigma_{sat}$ being the noise in the nominal pseudo-range measurement and $\sigma x_{in}$ being the noise in the horizontal x-component of the inertial measurement.

7. A method as defined in claim 5 wherein the linearized n×4 measurement matrix of the nominal system has a line comprising the elements 0, $\sigma_{sat}/\sigma y_{in}$, 0, 0 added, $\sigma_{sat}$ being the noise in the nominal pseudo-range measurement and $\sigma y_{in}$ being the noise in the horizontal y-component of the inertial measurement.

8. A method as defined in claim 5 wherein the linearized n×4 measurement matrix of the nominal system has a line comprising the elements 0, 0, $\sigma_{sat}/\sigma z_{in}$, 0 added, $\sigma_{sat}$ being the noise in the nominal pseudo-range measurement and $\sigma z_{in}$ being the noise in the vertical component of the inertial measurement.

9. A method as defined in claim 1 wherein the nominal position finding is carried out by means of a satellite navigation system.

10. A method as defined in claim 1 wherein the n×4 measurement matrix (G) of the nominal system in general has the following appearance, before its dimension is increased:

$$\underline{G} = \begin{bmatrix} c_{11} & c_{12} & c_{13} & 1 \\ c_{21} & c_{22} & c_{23} & 1 \\ \vdots & \vdots & \vdots & \vdots \\ c_{n1} & c_{n2} & c_{n3} & 1 \end{bmatrix}.$$

11. A method as defined in claim 1 wherein said method is used as an instance for error identification in a hybrid inertial/satellite navigation system.

* * * * *